Sept. 27, 1966 W. STURM 3,274,994
ARRANGEMENT FOR INDICATING FUNCTIONAL DISTURBANCES
IN A LIVING BODY
Filed Dec. 7, 1962

Inventor:
Walter Sturm by Michael S. Striker
Atty

United States Patent Office 3,274,994
Patented Sept. 27, 1966

3,274,994
ARRANGEMENT FOR INDICATING FUNCTIONAL DISTURBANCES IN A LIVING BODY
Walter Sturm, Larchenring, Germany, assignor to Quarzlampen Gesellschaft m.b.H., Hanau am Main, Germany
Filed Dec. 7, 1962, Ser. No. 243,149
Claims priority, application Germany, Dec. 8, 1961, Q 687
7 Claims. (Cl. 128—2)

The present invention concerns an arrangement for indicating functional disturbances in a living body.

It is well known that human beings who are subjected to abnormal strain may suffer organic damage because the particular strain causes one or the other functional disturbance in the human body. For instance, it occurs frequently that men working in mines, i.e., underground suffer brain hemorrhages due to the particular working conditions, especially hard work at high ambient temperature. The same applies to fire fighters and rescue crews. But also in other fields similar problems exist for instance with patients who are subjected to certain treatments of comparatively long duration, e.g., a drop infusion.

The present invention is based on the fact that a great number of the above mentioned functional disturbances, before causing a permanent damage, cause a rise of the body temperature of the particular person, at least in the area of the affected portion of the body. It has been found that for obtaining a desirable warning of dangerous conditions it is not necessary to monitor or record continuously the changes of body temperature but that it is sufficient if a warning signal is given whenever the body temperature exceeds a predetermined value. For instance a functional disturbance which may lead to a brain hemorrhage causes first a rise of the brain temperature. Danger exists as soon as the temperature exceeds, e.g., 39° C. Consequently it is possible to restrict the function of the arrangement according to the invention to detecting temperature conditions within a comparatively small critical range whereby the entire arrangement according to the invention becomes rather simple and comparatively inexpensive.

It is therefore one object of the invention to provide for an arrangement which is adapted to detect temperature changes of a living body, particularly of a human body, and to furnish a warning signal when the body temperature exceeds a predetermined value.

It is another object of the invention to provide for an arrangement as set forth which is adapted to be carried by the individual person and issues a warning signal directly to that person.

It is still another object of the invention to provide for an arrangement as mentioned above which is comparatively simple in structure and reliable in operation.

With above objects in view the invention includes an arrangement for indicating functional disturbances in a living body, particularly of mining personnel working underground, comprising, in combination, a housing means adapted to be worn on a living body; electric temperature detector means arranged in said housing means in such a manner that when said housing means is worn on the living body said temperature detector means is exposed to the body temperature, said temperature detector means having an electric characteristic which changes with changes of the temperature to which it is exposed; and electric signaling means connected with said detector means for producing a signal when during a change of said temperature said electric characteristic assumes a predetermined value.

It will be understood that it is generally advisable to construct the arrangement according to the invention in such a manner that not only the temperature detector but also the signal issuing means are worn on the human body of the person to be protected so that this person upon receiving a warning signal may move to a safer place. Only in cases where the particular person would not be capable of doing this, e.g., in the case of bed-ridden patients, it would be advisable to arrange the signal issuing means at a place remote from the patient.

In most cases it is of particular advantage to arrange the temperature detector and the signal issuing device within one common housing. Since the body temperature is measured or checked by a device which is worn on the body it is also possible to arrange for a warning signal which is applied directly to an organ of sense located at or near the point where the combined temperature detector and signal issuing means are worn.

For instance one form of issuing a warning signal consists in applying a stimulating current in the form of a sequence of pulses to that portion of the human body where the temperature thereof is being measured. Another highly advantageous form of issuing a warning signal consists in giving an acoustic signal by means of an acoustic signal issuing device which is arranged together with the temperature detector in a housing which may be fitted into the auditory canal of the ear because the temperature within this canal is very close to the general inner temperature of the body. Particularly if a warning is to be given to prevent brain hemorrhages the measuring of the temperature in the auditory canal is highly desirable because this portion of the body is closely adjacent to the brain. At the same time the acoustical signal issuing device can be extremely small if this device is located as mentioned above directly next to the ear. In spite of the smallness of the acoustical signal issuing device the signal cannot go unnoticed or be ignored for an extended period of time. As a signal producing device a multivibrator arrangement controllable by a change of an electrical characteristic of the temperature detector is particularly advantageous. Such a multivibrator is capable of producing a pulse sequence which may be used for instance for producing an acoustical signal or for producing a stimulating current, and all this with very low power consumption and without the need of movable contacts. Consequently the operation of this device will not cause the danger of an explosion in a mine. It is important to bear in mind that when a multivibrator has been once actuated it will keep in operation for an indefinite period. Consequently, a person which leaves the danger area where the person has obtained a warning signal can be identified by others because of the still operating signal. Therefore such a person can be subjected to medical treatment or investigation. A switch may be provided in the device which the physician may use for rendering the signal device inoperative.

It is further to be borne in mind that it is very simple to control a multivibrator. For instance, the temperature detector may consist of a temperature-dependent variable resistor connected in a voltage divider or potentiometer circuit controlling the multivibrator. In this case it is advisable to provide a Zener diode connected in parallel with the voltage divider for stabilizing the voltage applied thereto.

It is further advisable to provide for a plug and socket connection between the temperature detector and/or signal issuing device, on one hand, and the signal producing device and source of energy, on the other hand. If the connections between plug and socket are locked together after being joined, the danger of an explosion in a mine by the formation of sparks which may be caused when contacts are openly separated from each other is eliminated.

Preferably the signal issuing device and the temperature detector are arranged jointly in one common housing, the latter being interchangeable so that housings of different sizes can be fitted with the same detector and signal issuing devices. In this case it is also possible to check and to calibrate the signal issuing and temperature detector means in relation with the signal producing means whereafter the calibrated set can be inserted in any desired housing of selected shape or dimension depending upon how and where the arrangement is to be used.

The novel features which are considered as characteristic for the invention are set forth in particular in the appended claims. The invention itself, however, both as to its construtcion and its method of operation, together with additional objects and advantages thereof, will be best understood from the following description of specific embodiments when read in connection with the accompanying drawing, in which:

Figure 1:
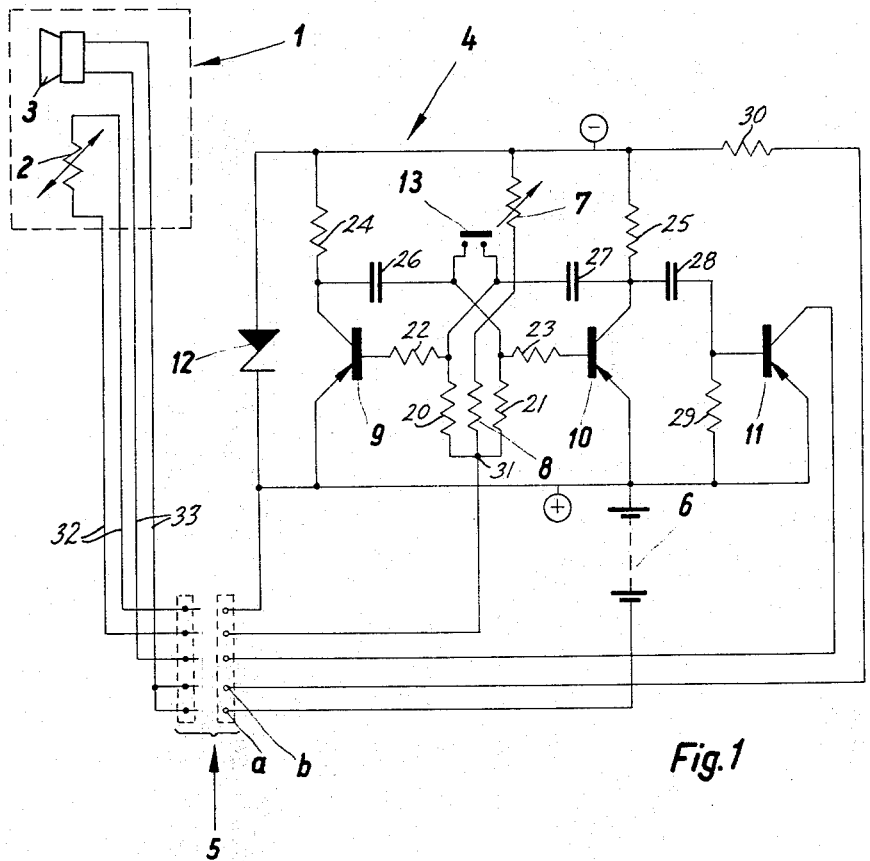
FIG. 1 is a schematic general circuit diagram of an arrangement according to the invention, the signal issuing device and the temperature detector being combined as one structural unit.

Referring now to FIG. 1, the entire arrangement is composed essentially of two units, namely a unit 1 which may comprise a housing adapted to be introduced into the auditory canal of a human ear and containing a temperature detector device in the form of a temperature-dependent variable resistor 2 and an acoustical signal issuing device 3, and a unit 4 which may be carried or located anywhere and contains the electrical circuit means of the arrangement. The units 1 and 4 may be connected with each other by a plug and socket connection 5.

The electrical circuit means of the unit 4 comprise a source of electric energy, e.g. a battery 6, the positive terminal whereof is directly connected to a bus-bar line marked with the plus sign while its negative terminal is connected via the contacts a and b of the plug connection 5 with a negative busbar line marked with the negative sign. Thus the battery 6 is connected with the remaining circuits only when the plugs of the plug connection 5 are inserted into the corresponding socket.

The circuit arrangement comprises a multivibrator controllable by adjustable voltage divider means. The main components of the multivibrator are two transistors 9 and 10. The voltage divider comprises a potentiometer 7, a resistor 8 and the variable resistor 2 connected in series with each other between the above-mentioned positive and negative busbar. The controlling voltage for the multivibrator is tapped from the voltage divider at the junction point 31 located between the resistor 8 and the variable resistor 2. The voltage tapped from the voltage divider is applied via the base resistors 21, 23 to the base of transistor 10 and via base resistors 20, 22 to the base of transistor 9. However the value of the tapped voltage at the junction point 31 depends first on the setting of the potentiometer or variable resistor 7 the setting of which determines the condition at which the multivibrator is to be actuated, and secondly on the varying resistance of the temperature-dependent variable resistor or temperature detector 2. When the resistance change of the variable resistor 2 reaches a predetermined value corresponding to the body temperature exceeding a predetermined value the potential available at the junction point 31 and applied to the transistors 9 and 10 will start the operation of the multivibrator.

The series resistor 8 is provided only for limiting the range of voltage regulation and is therefore connected in series with the adjustable resistor 7. The resistor 21 together with the capacitor 26 connected as shown, and the resistor 20 together with the capacitor 27 connected as shown, determine the frequency of the pulsating energy furnished by the multivibrator which is per se of conventional design. The resistors 22 and 23 have only decoupling function and serve to stabilize the operation of the circuit. The resistors 24 and 25 are conventional load resistors in the collector circuits of the transistors. The capacitor 28 is a coupling capacitor in relation to the low frequency transistor 11. Resistor 29 is a conventional base resistor for the transistor 11. The resistor 30 and a Zener diode 12 connected between the terminals of the battery 6 serve in a conventional manner for stabilizing the voltage of the battery. In this manner the operation of the multivibrator is stabilized as well as the voltage divider circuit, while the low frequency amplifier circuit comprising the transistor 11 remains unstabilized.

The function and operation of the illustrated multivibrator arrangement is well known and therefore does not require detailed description.

As stated above, as soon as a predetermined potential occurring at the junction point 31 is applied to the bases of the transistors 9 and 10, i.e. to the multivibrator arrangement the latter starts to operate and its output is amplified by the transistor 11 and thereafter applied to the signal issuing device 3 which may be an ordinary small size speaker whereby a signal is produced which can be perceived by the human ear.

A switch 13 preferably of the push-button type is provided to close the multivibrator circuit when the switch contact is moved into circuit-closing position, and in a similar manner by a second actuation of the push-button switch 13 the just mentioned connection can be interrupted and thereby the operation of the multivibrator terminated.

Figure 2:
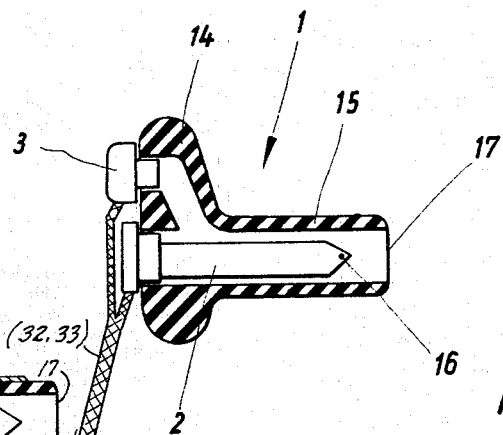
FIG. 2 is an axial section through a housing containing a temperature detector and a signal issuing device and adapted to be introduced into the auditory canal of a human ear.

FIG. 2 illustrates at an arbitrary scale an embodiment of the unit 1. A housing 14 of insulating material is shaped to be adapted to be fitted into the auditory canal of a human ear. The housing 14 has a longitudinal duct 15 ending with an opening 17 and accommodating a temperature-dependent resistor 2 constituting the temperature detector. The temperature-sensitive portion of this element is located at the tip 16 close to the opening 17 and therefore exposed to the body temperature in the auditory canal when the housing 14 is fitted into the latter. The main duct of the housing 15 has a branch which leads to an opening into which a small signal issuing device 3 e.g. a small size speaker is inserted. The components 2 and 3 are connected by a four-wire cable containing the lines 32 and 33 of FIG. 1 with the plug section of the connector 5. The elements 2 and 3 are disconnectably fitted into the housing 14 so that these elements can be removed therefrom and placed in the same manner into another housing having different shapes or dimensions. If desired the opening 17 may be closed with a protective mesh. Before placing the entire arrangement according to FIGS. 1 and 2 into operation the electrical circuit is first calibrated by adjusting of the variable resistor 7 in such a manner that the multivibrator will be actuated at a predetermined temperature influencing the detector 2. This temperature may be predetermined and selected in the particular case described so as to be e.g. 39° C. This calibration can be carried out without the elements 2 and 3 being inserted into the housing 14 and independently of the person which is intended to carry the unit 1. When the arrangement is to be used the elements 2 and 3 are inserted into a selected housing 14 the portion 15 of which may have a selected length to fit the particular ear whereafter the housing 14, 15 may be introduced into the ear of the particular person and the plug and socket connection 5 may be joined. As soon as a temperature exceeding 39° C. occurs in the auditory canal, the multivibrator with the transistors 9 and 10 will be actuated and applies via the amplifying transistor 11 a signal to the speaker 3 which now issues an audible signal. This informs the person who wears the unit 1 that danger exists so that the person is induced to leave the area where he may be at that moment. However, the multivibrator remains in operation even if the temperature detected by the detector 2 should decrease again, for instance if the person should take the unit 1 out from his ear. In this case it can still be ascertained afterwards that in view of the still operating multivibrator at least a danger for the particular person had existed. For safety's sake the switch 13 should be so arranged or constructed that it can be operated for inactivating the multivibrator only with the help of certain instruments or tools so that only the investigating physician should be able to restore the arrangement to inoperative condition.

Figure 3:
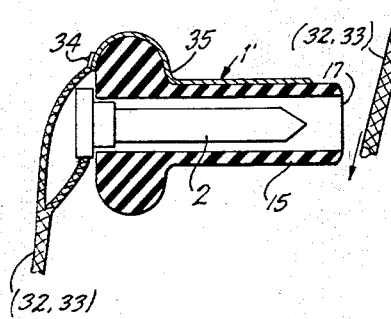
FIG. 3 illustrates in the same manner a modification of the arrangement according to FIG. 2, the acoustical signal issuing device being replaced by an electrode for applying a stimulating current to the human body.

As has been mentioned above, instead of an acoustical signal also other types of signals may be furnished by the arrangement according to the invention. For instance, as illustrated by FIG. 3, the same current which operates the acoustical signal issuing device 3 can be used for applying a stimulating current to the human body. For this purpose the housing 14, 15 is provided at its outer surface at least partially with conductive electrode layer 35 which have terminals 34 connected with the lines 32 of FIG. 1. Therefore the voltage pulses which would otherwise be applied to the speaker 3 according to FIG. 2 will now be applied to the electrodes 35 and by the electrodes to the adjacent portion of the human body so as to give a stimulating signal.

It should be noted that the arrangement according to the invention may apply not only for detecting functional disturbances of human beings but under certain circumstances the same procedure may take place in connection with test animals. Instead of the above-described acoustical signal issuing device or the arrangement for issuing a stimulating pulse sequence to the human body also other signaling devices may be used which are adapted to be effective on other sense organs e.g. light signal issuing devices. The signal producing means may be selected depending upon the nature of the desired signal issuing device. For instance, instead of a multivibrator also a generator of alternating current voltage together with a modulator may be used, and in certain cases even a mechanical buzzer would be adequate. As a matter of fact for producing a light signal just a source of electric energy in connection with temperature controlled switch means may be used. The switch means need not be of electromechanical nature as for instance a relay, but also other types of current or voltage control means may be used as for instance switching transistors, premagnetized chokes and the like. The temperature detector should be preferably a temperature-dependent variable resistor, but it may also be of the nature of a thermo-element or may comprise material which expands with increasing temperature and actuates via a capillary tube a contact device.

It will be understood that each of the elements described above, or two or more together, may also find a useful application in other types of an arrangement for indicating functional disturbances in a living body differing from the types described above.

While the invention has been illustrated and described as embodied in an arrangement for indicating functional disturbances in a living body including electric temperature detector means cooperating with electric signalling means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for indicating functional disturbances in a living body, particularly of mining personnel working underground, comprising, in combination a housing means having a wider outer portion of a given diameter adapted to be seated in the concha of the ear and an elongated narrower inner portion of a diameter less than said given diameter, only said elongated inner portion being adapted to be fitted into the auditory canal of an ear so as to be worn on a living being, said housing being closed at its outer end for preventing intrusion of ambient air into the auditory canals and forming a compartment; electric temperature detector means arranged in said compartment in such a manner that when said narrower inner portion is disposed in the auditory canal of an ear said temperature detector means is exposed to the body temperature only, and is protected from the temperature of the ambient air outside the auditory canal, said temperature detector means having an electric characteristic which changes with changes of the temperature to which it is exposed; and electric signaling means comprising an acoustical signal issuing means arranged also in said compartment of said housing means for giving when actuated an acoustical signal to be heard only by said living being who wears said housing means and signal producing electric circuit means actuating said signal issuing means and connected with said detector means for producing a signal when said temperature exceeds a predetermined value and accordingly said electric characteristic assumes a predetermined value.

2. An arrangement for indicating functional disturbances in a living body, particularly of mining personnel working underground, comprising, in combination, a housing means including a wider outer portion of a given diameter adapted to be seated within the concha of the ear closing the same, and a tubular narrower inner portion of a diameter less than said given diameter, said inner portion being adapted to be fitted into the auditory canal of an ear so as to be worn on a living being, said housing being closed at its outer end for preventing intrusion of ambient air into the auditory canal and forming a compartment; electric temperature detector means arranged in said narrower inner portion adjacent the open end of said compartment so that when said housing means is worn on the living body said temperature detector means is exposed to the body temperature only, and is protected from the temperature of the ambient air outside the auditory canal, said temperature detector means having an electric characteristic which changes with changes of the temperature to which it is exposed; and electric signaling means comprising an acoustical signal issuing means arranged in said compartment of said housing means for giving when actuated an acoustical signal to be heard only by said living being who wears said housing means and signal producing electric circuit means including multivibrator means controllable by said electric characteristic of said temperature detector means actuating said signal issuing means and connected with said detector means for producing a signal when said temperature exceeds a predetermined value and accordingly said electric characteristic assumes a predetermined value.

3. An arrangement as claimed in claim 2 wherein said electric circuit means include a source of electric energy and voltage divider means connected between said source and said multivibrator means for controlling the latter depending upon the voltage derived from said voltage divider means and furnished to said multivibrator means, said temperature detector means being a temperature-dependent variable resistor means connected as a part of said voltage divider means so that a variation of said body temperature produces a corresponding change of said voltage.

4. An arrangement as claimed in claim 3, wherein said circuit means include a Zener diode connected in parallel with said voltage divider means.

5. An arrangement as claimed in claim 3 wherein said voltage divider means include a potentiometer for presetting the voltage derived from said voltage divider means and actuating said multivibrator means when said temperature-dependent variable resistor means assumes a predetermined resistance value in accordance with said temperature exceeding a predetermined value.

6. An arrangement as claimed in claim 3, wherein said electric circuit means include a disconnectable plug and socket connection for simultaneously connecting and disconnecting said source of energy, said multivibrator means, said signal issuing means and said temperature detector means, respectively.

7. An arrangement for indicating functional disturbances in a living body, particularly of mining personnel working underground, comprising, in combination, a housing means including a wider outer portion of a given diameter adapted to be seated within the concha of the ear closing the same, and a narrower inner portion of a diameter less than said given diameter, said inner portion being adapted to be fitted into the auditory canal of an ear so as to be worn on a living being, said housing means being formed with a central passage extending through said inner and outer portion and with another passage offset from said central passage and communicating therewith; electric temperature detector means arranged in said central passage in such a manner that when said housing means is worn on the living body, said temperature detector means is exposed to the body temperature, said temperature detector means having an electric characteristic which changes with changes of the temperature to which it is exposed; and electric signaling means comprising an acoustical signal issuing means arranged in said other passage of said housing means for giving when actuated an acoustical signal to be heard only by said living being who wears said housing means, and signal producing electric circuit means including multivibrator means controllable by said electric characteristic of said temperature detector means actuating said signal issuing means, and connected with said detector means for producing a signal when said temperature exceeds a predetermined value and accordingly said electric characteristic assumes a predetermined value, said electric circuit means including a Zener diode connected in parallel with said multivibrator means, and switch means actuating in its closed condition said multivibrator means which continue producing an electrical signal once they have been actuated, said switch means in its open condition rendering said multivibrator means again inactive.

References Cited by the Examiner
UNITED STATES PATENTS

| | | | |
|---|---|---|---|
| 1,156,317 | 10/1915 | Santos et al. | 128—407 |
| 2,217,797 | 10/1940 | Donovan. | |
| 2,409,033 | 10/1946 | Garceau | 128—2.1 |
| 2,546,275 | 3/1951 | Redding | 128—2.1 |
| 2,736,313 | 2/1956 | Mathieson | 128—2.1 |
| 2,816,997 | 12/1957 | Conrad | 128—2 X |
| 2,984,729 | 5/1961 | Hykes. | |
| 3,041,553 | 6/1962 | Boreen | 331—113 X |
| 3,054,397 | 9/1962 | Benzinger | 128—2 |
| 3,156,117 | 11/1964 | Benzinger | 128—2 X |

RICHARD A. GAUDET, *Primary Examiner.*

ROBERT E. MORGAN, *Examiner.*

W. E. KAMM, *Assistant Examiner.*